United States Patent Office 3,540,843
Patented Nov. 17, 1970

---

3,540,843
EXTRACTION ACIDULATION PROCESS
Edward Brooks Becker, Shawnee Mission, Kans., assignor to Gulf Research & Development Company, Pittsburgh, Pa., a corporation of Delaware
No Drawing. Filed July 28, 1967, Ser. No. 656,710
Int. Cl. C01b 25/18
U.S. Cl. 23—165                     4 Claims

ABSTRACT OF THE DISCLOSURE

Particulate calcium phosphate rock is reacted with a two-phase liquid mixture of hydrochloric acid and 2-ethylhexanol or other branched eight-carbon atom primary alcohol to yield a reaction mixture consisting of solid sludge, aqueous calcium chloride and a solution of orthophosphoric acid in 2-ethylhexanol which is readily separated mechanically from the rest of the mixture as a result of its relatively lower specific gravity.

SUMMARY OF INVENTION

Crude orthophosphoric acid is customarily produced by reacting a strong mineral acid such as sulfuric with phosphate rock, usually tricalcium phosphate associated with calcium carbonate and calcium fluoride. Although the acid reaction does generate orthophosphoric acid, there remains a purification problem because of the various impurities which are normally present. One approach to this problem has been to extract the orthophosphoric acid from the mixture with a selective solvent, after which the solvent is recovered. This type of process is exemplified in the following U.S. patents: 2,880,063, 3,304,157, 3,311,450, 3,072,461. Unfortunately processes of this type are characterized by a large number of parameters, of which not all are readily controllable. The selective solvent, customarily employed in a separate extraction step, must possess a number of rather specific characteristics in order for the process to be operable. Various additives for the solvent and adjustments of reaction mixture composition have been proposed for the improvement of selective extraction. However, this introduces new variables into the process, usually accompanied by new problems.

I have discovered that when calcium phosphate-containing material is reacted with a two-phase liquid mixture of hydrochloric acid and 2-ethylhexanol or other branched eight-carbon atom primary alcohols there occurs a fortuitous partitioning of solutes and separation of phases. The aqueous phase accumulates calcium chloride and increases greatly in specific gravity, insoluble components readily settle as sludge and most of the orthophosphoric acid migrates to the branched octyl alcohol phase, which has a comparatively low specific gravity. The solution of phosphoric acid in branched octyl alcohol is readily separated mechanically by utilizing the difference in specific gravity between the phases. By distilling off a portion of the alcohol solution, a concentrated solution of phosphoric acid is obtained which is substantially free of hydrochloric acid and other impurities.

The branched octyl alcohol solution of orthophosphoric acid may be utilized in various ways. Aqueous acid may be obtained by countercurrent extraction with water. Ammonium phosphate may be precipitated from the solution by direct ammoniation and the product recovered by filtration. Concentrated aqueous phosphoric acid may be recovered by removing the solvent by distillation. For the purpose of preparing phosphoric acid and phosphates of high purity, the octyl alcohol solution may be passed through a column of cation exchange resin which retains the metal ions. The purified phosphoric acid may then be recovered from the solution by extraction with water. Alternatively, the alcohol solution of hydrochloric and phosphoric acids may be extracted with water, transferring the acids to the aqueous extract phase, and the hydrochloric acid is removed by distillation to yield an aqueous phosphoric acid product.

DETAILED DESCRIPTION OF THE INVENTION

(A) Solvent

In choosing a solvent it is desirable that calcium ion solubility be very low in the solvent so that the phosphorus can be recovered as phosphoric acid without adding a calcium removal procedure. It is also desirable that the solvent be very insoluble in the aqueous calcium chloride solution so that it will not be necessary to recover it from this waste product. In addition the solvent must not be decomposed to an economically prohibitive extent by repeated heating in the presence of hydrochloric acid. The preferred solvent for this process is 2-ethylhexanol because it best satisfies the above criteria. The mixed phase system is not troublesome from the standpoint of foaming or formation of stable emulsions or mixtures which are difficult to filter. The pronounced immiscibility of the two liquid phases apparently contributes to the ease of handling of the reaction mixtures.

The tendency for naturally occurring high molecular weight organic substances to concentrate at organic solvent-aqueous phase interfaces and stabilize emulsions is well known. The organic impurities in phosphate rock are responsible for the dark color and foaming tendencies of ordinary wet process phosphoric acid. In this process the organic impurities of the phosphate rock do not concentrate at the interface between the liquid phases. This appears to result from a fortuitous interrelationship between aqueous and solvent phases.

(B) Acid concentration

A hydrochloric acid content 1.5 to 2 times the stoichiometric amount required to react with the calcium in the phosphate rock is preferred. More HCl can be used but with no substantial advantage. The use of less acid decreases the efficiency of the acidulation. Ordinary commercial concentrated hydrochloric acid is the preferred reagent. The hydrochloric acid partitions between the aqueous and solvent phases during the reaction.

(C) Reaction time and temperature

At a temperature of 40° C., twenty to thirty minutes is sufficient reaction time. Efficiency of reaction decreases with shorter times although the reaction takes place to a major extent in less than five minutes. There is no advantage to extension of reaction time beyond an hour.

Example 1.—A mixure of 520 g. 2-ethylhexanol and 160.4 g. 37% hydrochloric acid was made up. At equilibrium two liquid phases were formed. Fifty grams of Florida phosphate rock containing 7.35 g. phosphorus and 17 g. calcium was then added. The combination was stirred for 45 minutes at a temperature of 33.5±1.5° C. Stirring was then stopped and the mixture allowed to settle for 30 minutes. The clear upper layer (2-ethylhexanolrich) was then decanted. It weighed 582 g. and contained 0.97% P, 0.046% Ca, 4.0% $H_2O$, and 4.5% Cl. Thus 77% of the phosphorus and 2% of the calcium was in this layer. About one third of this liquid was then distilled at about 25 mm. Hg and up to 80° C. The clear liquor that remained in the still pot contained 1.4% P, 0.06% Cl, and 0.05% $H_2O$.

The slurry of solid residue and concentrated aqueous calcium chloride solution was stirred with a mixture of 500 g. 2-ethylhexanol and 70.8 g. 37% HCl for 30 minutes. This mixture was allowed to settle and then the clear upper layer was decanted. It weighed 560 g. and contained 0.2% P, or 15% of the total phosphorus in the rock, and about 0.4% Ca or 1% of the total calcium in the rock. This illustrates the benefit derived from subjecting the pulverized rock to a repetition of extractive acidulation.

The insolubles that remained were separated from the calcium chloride solution by centrifugation. The solids weighed 7.0 gm. and contained 0.63% P, 22.6% Ca and 21% Cl. This was 1% of the total phosphorus and 9% of the total calcium. The calcium chloride solution contained 5% of the total phosphorus and 88% of the total calcium. There was less than 0.1% 2-ethylhexanol in the calcium chloride solution.

Example 2.—Fifty grams of Florida phosphate rock was added to a mixture of 630 ml. 2-ethylhexanol and 135 ml. 37% HCl and stirred for 45 minutes. Twenty grams of pure anhydrous calcium chloride was then added to assure that the solution was saturated with calcium and the total mixture was stirred another 30 minutes. After settling, the clear upper liquid layer was decanted. This 2-ethylhexanol phase weighed 570.1 g. and contained 0.99% P or 77% of the total P and about 0.03% Ca or about 0.6% of the total Ca. The residue, a slurry of insolubles and aqueous calcium chloride solution, was stirred for one hour with 600 ml. 2-ethylhexanol, 70 ml. 37% HCl, and 20 g. anhydrous calcium chloride. Again this system was allowed to settle and the top phase decanted. The insoluble material was separated from the aqueous calcium chloride solution by centrifuging. The top, 2-ethylhexanol phase from this treatment weighed 551.3 g. and contained 0.25% P or 19% of the total and about 0.03% Ca or about 0.6% of the total. The dried solid residue weighed 12.3 g. and contained 0.33% P or 0.6% of the total P and 25.1% Ca or 10% of the total Ca. The calcium chloride solution weighed 179.0 g. and contained 0.12% P or about 2% of the total and 15% Ca or about 84% of the total.

The solution of phosphoric acid in 2-ethylhexanol obtained in Example 2 was ammoniated with gaseous ammonia, yielding a precipitate of ammonium phosphate of satisfactory fertilizer grade, which was separated by filtration. The 2-ethylhexanol filtrate was re-used in extractive acidulation without further purification.

The above examples are laboratory scale, for illustrative purposes only. Pure 2-ethylhexanol is selected for purposes of demonstration although cheaper mixed branched octyl alcohols would probably be preferable for use in a full scale plant on the basis of economic considerations. The laboratory experiments result in normal handling losses of phosphoric acid product which need not occur in well-managed plant practice.

I claim:

1. A process for manufacturing a solution of orthophosphoric acid in a non-aqueous solvent comprising the steps:
   (a) reacting particulate calcium phosphate rock with a mixture of aqueous hydrochloric acid and a branched primary alcohol having eight carbon atoms to yield a mixture of solid and liquid phases consisting of particulate solids, an aqueous solution of calcium chloride, and a liquid phase of relatively lower specific gravity consisting essentially of branched primary alcohol solvent having dissolved therein orthophosphoric acid and a portion of the unreacted hydrochloric acid,
   (b) separating the liquid phase of lower specific gravity from the other phases obtained in step (a) mechanically by utilizing the difference in specific gravity and
   (c) distilling hydrochloric acid from the liquid phase of lower specific gravity separated in step (b) to yield a product consisting essentially of a solution of orthophosphoric acid in a branched primary alcohol having eight carbon atoms.

2. A process for manufacturing an aqueous solution of orthophosphoric acid comprising the steps:
   (a) reacting particulate phosphate rock with a mixture of aqueous hydrochloric acid and a branched primary alcohol having eight carbon atoms to yield a mixture of solid and liquid phases consisting of particulate solids, an aqueous solution of calcium chloride and a liquid phase of relatively lower specific gravity consisting essentially of branched primary alcohol solvent having dissolved therein orthophosphoric acid and a portion of the unreacted hydrochloric acid,
   (b) separating the liquid phase of lower specific gravity from the other phases obtained in step (a) mechanically by utilizing the difference in specific gravity,
   (c) extracting with water the liquid phase of lower specific gravity separated in step (b) to yield an aqueous solution of hydrochloric and phosphoric acids and
   (d) distilling hydrochloric acid from the aqueous solution obtained in step (c) to yield an aqueous phosphoric acid product.

3. A process according to claim 1 in which the branched primary alcohol employed as a solvent is 2-ethylhexanol.

4. A process according to claim 2 in which the branched primary alcohol employed as a solvent is 2-ethylhexanol.

References Cited

UNITED STATES PATENTS

| 1,929,441 | 10/1933 | Milligan | 23—165 |
| 2,880,063 | 3/1959 | Baniel et al. | 23—165 |
| 3,408,161 | 10/1968 | Nickerson et al. | 23—165 |

FOREIGN PATENTS

| 672,008 | 10/1963 | Canada. |

OSCAR R. VERTIZ, Primary Examiner

G. A. HELLER, Assistant Examiner

U.S. Cl. X.R.

23—312